(12) United States Patent
Palinkas et al.

(10) Patent No.: US 8,087,949 B2
(45) Date of Patent: Jan. 3, 2012

(54) CONNECTOR WITH A THREADED ACTUATOR AND A SEALING COMPONENT ENTIRELY WITHIN A NUT COMPONENT

(75) Inventors: Raymond Palinkas, Canastota, NY (US); Eric Purdy, Constantia, NY (US); Jonathan Shannon, Lunenburg, MA (US); Trevor Ehret, North Haven, CT (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 0 days.

(21) Appl. No.: 12/786,062

(22) Filed: May 24, 2010

(65) Prior Publication Data

US 2011/0130025 A1 Jun. 2, 2011

Related U.S. Application Data

(60) Provisional application No. 61/181,073, filed on May 26, 2009.

(51) Int. Cl.
*H01R 13/52* (2006.01)
(52) U.S. Cl. ....................................... 439/277; 429/444
(58) Field of Classification Search .................. 439/275, 439/277, 320, 584, 589, 578, 583
See application file for complete search history.

(56) References Cited

U.S. PATENT DOCUMENTS

| | | |
|---|---|---|
| 3,913,956 A | 10/1975 | Eidelberg et al. |
| 4,629,825 A | 12/1986 | Lackinger |
| 5,087,795 A | 2/1992 | Guginsky |
| 5,857,865 A * | 1/1999 | Shimirak et al. ............... 439/277 |
| 7,207,820 B1 * | 4/2007 | Montena ....................... 439/275 |
| 7,214,095 B1 * | 5/2007 | Mathews ....................... 439/578 |
| 7,351,101 B1 * | 4/2008 | Montena ....................... 439/584 |
| 7,354,309 B2 * | 4/2008 | Palinkas ....................... 439/588 |
| 7,500,874 B2 * | 3/2009 | Montena ....................... 439/587 |
| 7,524,208 B2 * | 4/2009 | Mathews ....................... 439/587 |
| 2006/0219437 A1 | 10/2006 | Chiu |

FOREIGN PATENT DOCUMENTS

| | | |
|---|---|---|
| KR | 200196265 Y1 | 9/2000 |
| KR | 200401178 Y1 | 11/2005 |
| KR | 20080001568 U | 6/2008 |

OTHER PUBLICATIONS

PCT/US2010/036100; International Search Report and Written Opinion—Date of Mailing: Dec. 30, 2010; Applicant's Reference No. ID-1472-PCT); 9 pp.

* cited by examiner

*Primary Examiner* — Chandrika Prasad
(74) *Attorney, Agent, or Firm* — Schmeiser, Olsen & Watts, LLP

(57) ABSTRACT

A novel, reliable, moisture migration preventing cable connector for non-standard port attachment is provided. Such a connector device includes a deformable sealing element that is clear of mating port threads during connector attachment to a cable port, but that deforms upon actuation of a mated thread device rotated around the connector subsequent to cable port attachment. Such deformation allows for the sealing element to enter the open areas of the mated threads thereby preventing the migration of moisture into the cable connector, protecting not only the connector threads, but also the mating port, as well as the internal dielectric and center conductor of the cable itself. A method of providing a signal connection and transfer in a cable system is also encompassed within this invention.

16 Claims, 9 Drawing Sheets

CONNECTOR WITH A THREADED ACTUATOR AND A SEALING COMPONENT ENTIRELY WITHIN A NUT COMPONENT

CROSS-REFERENCE TO RELATED APPLICATIONS

This application is a conversion from and claims the priority filing date of U.S. Provisional Application No. 61/181,073, filed on May 26, 2009. Said application is incorporated herewith in its entirety by reference.

FIELD OF THE INVENTION

A novel, reliable, moisture migration preventing cable connector for non-standard port attachment is provided. Such a connector device includes a deformable sealing element that is clear of mating port threads during connector attachment to a cable port, but that deforms upon actuation of a mated thread device rotated around the connector subsequent to cable port attachment. Such deformation allows for the sealing element to enter the open areas of the mated threads thereby preventing the migration of moisture into the cable connector, protecting not only the connector threads, but also the mating port, as well as the internal dielectric and center conductor of the cable itself. A method of providing a signal connection and transfer in a cable system is also encompassed within this invention.

BACKGROUND OF THE INVENTION

Cable connections have taken the form of various different assemblies in order to permit transmission through a cable (co-axial cable, for instance) to a port outside or inside an edifice (such as a dwelling), or perhaps through a second cable. Typical constructions for such port assemblies are threaded extensions with middle openings to accept the center conductor of a cable. Such constructions are generally configured to conform with connectors that can be screwed on with threads of suitably larger diameters for tight fitting resultant connections.

Non-standard interface ports are widely utilized and are generally difficult to account for, particularly when present in external environments (i.e., outdoors). Such non-standard configurations have a wide variety of lengths of ports, and thus threads, as well as flat surfaces for torque application that are difficult to properly apply force for effective connections (particularly when present in hard-to-reach locations). Standard interface ports have complementary connection assemblies that provide the necessary protections for proper signal transmissions and prevention of unwanted external dust, grime, and moisture. Non-standard types thus suffer from a lack of specifically designed devices to effectuate the desired level of environmental protections necessary to ensure reliable and proper signal transmissions.

Such non-standard ports can be attached, generally, to different types of connectors and function safely when utilized in low-humidity, indoor areas; in such situations, atmospheric moisture is not an appreciable problem and the ports and cables are not exposed, again, generally, to potentially deleterious wet environments. To the contrary, however, when utilized in totally external environments, moisture from precipitation, dew, or even from benign atmospheric conditions, can reside on the non-standard port/connector/cable surfaces and potentially migrate into the connection itself. In such a possible scenario, the cable connection may be compromised in terms of signal strength, the threads and cable components may be susceptible to corrosion (thus potentially causing signal weakening), and the overall reliability of the desired connection may be in jeopardy (ostensibly due to rusted threads that may become difficult to separate or the port threads lose the necessary degree of conductivity; in such a situation, the ability to reuse the connection port and cable may not be a future option). The capability of the connection assembly to properly effectuate shielding of external, unwanted signals, or to properly effectuate grounding of the electrical function itself, may also be potentially compromised through moisture presence within an outside cable connection. As such, high frequency transmission signals may be compromised by unwanted electrical interference with the loss of such properties.

In the past, the cable connection industry has implemented some remedial measures to potentially overcome these problems with moisture migration within cable connection assemblies. For instance, rubber washers have been utilized at the interface between ends of a cable and the subject port in attachment. Unfortunately, such an alternative fails to take into account the ease of movement moisture can exhibit around the open spaces in the interface; the threads of the connector and the port are still susceptible to moisture attack as a result. As well, the presence of rubber washers not accounted for during port, connector, and cable manufacturing would invariably create torque problems upon introduction as an external part. The forces required to overcome such an extra component may compromise the attachment reliability, and thus the needed transmission capability of the overall connection, thereby reducing potential signal strength, even if permitting a certain level of moisture migration protection.

Additionally, some installers have taken it upon themselves to apply glues or adhesives (TEFLON® tape, from duPont, for instance) on the threads of the components. Such an attempted fix, however, increases the thread diameters of inner connection portions and in turn increases the torque required to effectively attach and tighten the subject connection assembly to a subject port. In such an instance, as well, the chances of grounding reduction may occur due to improper installation as well. Repeated deattachment of the connection in such a situation may also lead to a weakened moisture seal requiring tape removal and recovering with further installations.

Some connections include o-ring components as well for a certain degree of possible moisture barrier. Such an o-ring, though, is typically only found at the bottom of the nut of a connection assembly, and thus does not protect the threads of a cable that will be located external to the point of placement of such an o-ring when a complete cable connection is made.

To date, then, there has been no effective manner of preventing moisture migration into an outdoor cable/port connection assembly, particularly with non-standard interface ports. An easy-to-install, reliable sealing connection assembly, would thus be of great interest to the cable connection industry, particularly with the versatility to be utilized in conjunction with non-standard ports and cables. No such device has been provided until now.

ADVANTAGES OF AND BRIEF DESCRIPTION OF THE INVENTION

One distinct advantage of the inventive cable connector device is the ability to easily apply a reliable moisture seal to a subject port to prevent environmental exposure to internal threads within the entire connection assembly. Another advantage of the inventive device is utilization of a deformable compression seal complementary in configuration to the subject port, thereby permitting proper connection without the need for excessive torque required for proper and reliable connector attachment. Additionally, the inventive device is versatile for application and attachment to and with different most types and lengths of ports as necessary, thereby exhibiting still another advantage.

Accordingly, this invention encompasses a cable connection assembly exhibiting a moisture migration prevention component integrated within said assembly, wherein upon attachment to a threaded port, said connection assembly exhibits moisture migration prevention at a location external to the port threads engaged within said connection assembly. Such an inventive connection assembly is accomplished through the utilization and presence of an inventive port sealing assembly comprising a nut component, a threaded actuator component, and a deformable sealing component; wherein said threaded actuator component nests within said nut component; wherein said threaded actuator component is ring-shaped with an inner threaded surface and an outer surface; wherein said nut component is ring-shaped with an inner surface and an outer surface; wherein said outer surface of said threaded actuator component exhibits a configuration complementary in shape to said inner surface of said nut component such that when nesting within said actuator component, the rotation of said nut component causes the rotation of said threaded actuator component; and wherein said deformable sealing component is ring-shaped and nests within said nut component atop said threaded actuator component. Also encompassed within this invention is the method of applying a moisture migration preventive seal to a full cable connection between said cable connection assembly and a coaxial cable threaded port through initial attachment of said cable connection assembly to said port followed by actuation of said nut, thereby moving said threaded actuator in the direction of said port and in turn deforming said deformable sealing component into the interstitial spaces of the port threads.

In such a manner, provided is a cable connection device that permits security and reliability in terms of moisture barrier and thus transmission capability (among other benefits), as well as simplicity in installation. The deformable sealing component within the port sealing assembly thus accords the effective moisture seal through expanding (upon deformation) into the spaces between the port threads. In such a manner, moisture is barred from entry at a point external to the actual point of attachment between the subject port and connection assembly, all without increasing the torque required for proper and reliable connection. In one potentially preferred embodiment the moisture seal between the port threads and the deformable sealing component is not made until the port sealing assembly nut is rotated and the threaded actuator (the threads of which are complementary in configuration to the port threads) causes the sealing component to compress into the port thread spaces (in essence, the threaded actuator is rotated to align and tighten with the port threads as the port sealing assembly nut is rotated). The reduction in volume within the resultant space in which the deformable sealing component is housed thus increases the compression upon the sealing component causing it to enter into any available space within the port thread area. In addition, the rotation of said port sealing assembly nut may be accomplished via hand or tool rotation; preferably, the nut component includes a roughened surface for the facilitation of finger or tool gripping to apply the necessary force for attachment. Alternatively, an outer surface of the nut component may include flat side for the utilization of a proper tool (i.e., pliers or wrenches) to effectuate the needed degree of tightening for connection to occur. Furthermore, the outer surface of the nut component may include both a roughened surface as well as an appropriate flat portion to permit either types of tightening (or both).

Such a connection device, including the invention port sealing assembly, thus, in this initially preferred embodiment, serves to decrease, if not completely prevent, moisture migration from an external environmental source into the internal parts of the overall cable/port connection. In such a manner, it is believed that an increased reliability of signal transmission, an extended lifetime for the cable/port connection component parts, and a simple installation procedure are accorded the user of this inventive device. The port sealing assembly thus not only provides a capability of moisture migration prevention, but also permits a secure, reliable attachment for proper transmission to occur during use, particularly when present external to an edifice. As noted above, the different lengths of non-standard cable ports have posed problems for installers in the past in providing reliable connections. With this inventive device, since the moisture seal is present at a point external to the actual cable/port connection, there is no need to use any further extrinsic materials to effectuate moisture barriers. A simple, elegant manner of simply attaching and actuating the port sealing assembly nut to a sufficiently tight degree provides all that is needed for utilization with any type of port, standard or non-standard in shape and/or length. However, the versatility such an inventive device exhibits in relation to non-standard length ports provides particularly effective and unexpectedly good results of moisture resistance with any such non-standard port apparatus.

The port sealing assembly itself comprises, as noted above, three basic components: a nut component, a threaded actuator component, and a deformable sealing component. The threaded actuator is configured as a ring-shaped tool, preferably with a substantially annular outer surface and a threaded inner surface. The outer surface may also be configured in any other geometric shape; the only limitation is that such an outer surface configuration is complementary to that of the inner surface of the nut component. The threaded actuator must nest within the nut component in order to permit simultaneous rotation of both components around the same axis when appropriate torque is applied to the outer surface of the nut component. Upon connection with a cable port, the thread of the cable port will align (as the male portion) within the threaded actuator (as the female portion); at such time, the nut component will be actuated to rotate, thereby causing rotation of the threaded actuator itself, resulting in, ultimately, the movement of the threaded actuator along the threads of the cable port. Simultaneously, with the deformable sealing component placed atop the nested threaded actuator component, particularly wherein the sealing component exhibits the same diameter as the threaded actuator (and will thus nest itself within the nut component), the movement of the threaded actuator component along the threads of the cable port will compress the deformable sealing component into the available spaces between the threaded actuator and the cable port itself. Thus, being of suitable deformable material, the sealing component will, as its name implies, seal the connection interface as well as the spaces between the cable port threads not conjoined with the threads of the threaded actuator.

The deformable sealing component may be any elastomeric material that exhibits proper compressibility to provide a suitable seal for moisture prevention. Such an elastomer may thus be thermoplastic rubber (such as, as one example, Santoprene™ from ExxonMobil), and thermoset rubber, such as, as examples, natural rubber, styrene butadiene rubber, nitrile butadiene rubber, or ethylene-propylene diene monomer rubber, urethane rubber, and silicone rubber. For the purpose of desired elasticity under a wide range of potential pressures and temperatures, silicone rubber is particularly preferred for this application.

The nut component and the threaded actuator component is preferably a non-conducting material of moldable plastic (nylon, acetal, for instance) or metal (such as die-cast zinc, machined brass, as one example).

The overall connection assembly will preferably include a conductor body and a post that includes proper cable wiring, etc., to transmit signals to and/or from the subject cable port. The connector body is preferably a conductive metal, as would be the metal basket portion of the cap. Thus, copper, gold, silver, aluminum, brass, spring steels (stainless), and the like, are preferred for such a purpose. The exterior of the connector body would preferably be plastic, such as polycarbonate, polyacrylic, acetal, etc., in order to reduce costs, provide insulation to the overall connection, and permit ease in handling for an installer or consumer. The connector body may be itself configured in any way to connect with any type of port as well. Thus, although standard cable television ports, f-type, etc., or the most common, the connector body may be configured for RCA and PAL connections (among others), too. The threaded actuator (and thus the port sealing assembly) is provided in a configuration that may be utilized with any type of target port and thus any type of connector body as the deformable sealing component does not rely upon any specific connection type. Thus, the versatility of the threaded actuator provides an excellent manner of capability to an installer to utilize a reliable moisture prevention connector for external connection needs.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown in the drawings. In the figures, the same reference numerals are used to indicate the same elements of each of the illustrated boards.

DETAILED DESCRIPTION OF THE DRAWINGS

Figure 1:
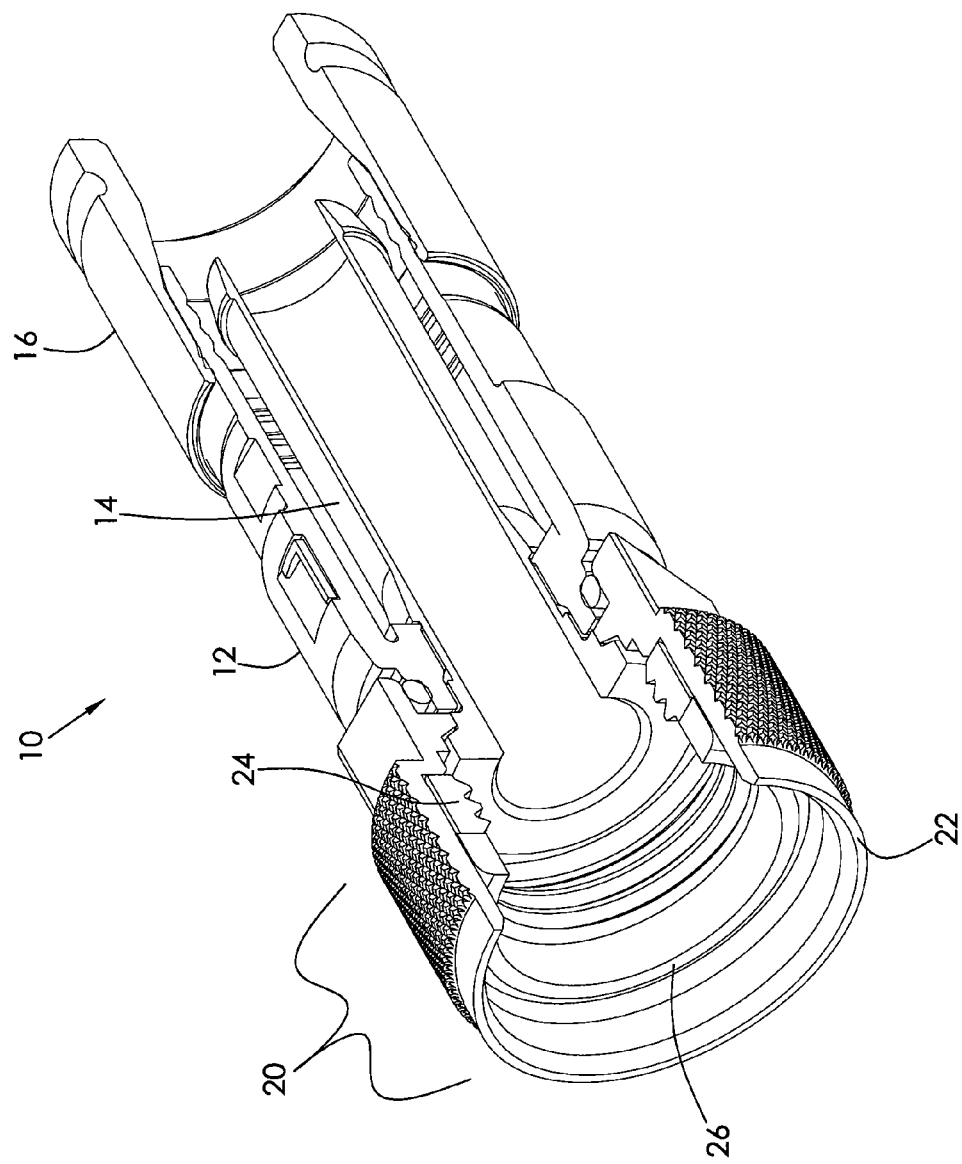
FIG. 1 depicts a partial cutaway view of a preferred open position embodiment of the invention.

FIG. 1 shows one potentially preferred embodiment of the inventive connection assembly 10 wherein a port sealing assembly 20 is present. A cable connector assembly 10 includes a connector body 12 housing a post 14 and partially covered by a compression sleeve 16 that encompasses a portion of the post 14 as well. The port sealing assembly 20 overlaps the connector body 12 and is configured to allow for a rotation of the nut component 22 of the port sealing assembly 20 around a cable port (628 of FIG. 7). The port sealing assembly 20 further includes a threaded actuator component 24 and a deformable sealing component 26, both nested within the nut component 22, with the sealing component 26 set atop the threaded actuator 24. The outer surface of the nut component is roughened in this embodiment in one portion and includes flat geometrical edges in another portion, to permit tightening of the nut component 22 with either a tool, by hand, or by both. The nut component 22 is this embodiment is in an open position without a lip or other abutment present above the sealing component 26. In such a configuration, a threaded port (528 in FIG. 6, for example) may be introduced into the threaded actuator component 24 thereby allowing for the deformable sealing component 26 to contact directly with the threaded port (528 in FIG. 6) through its top surface as well as its inner annular surface upon attachment and tightening of the nut component 22.

Figure 2:
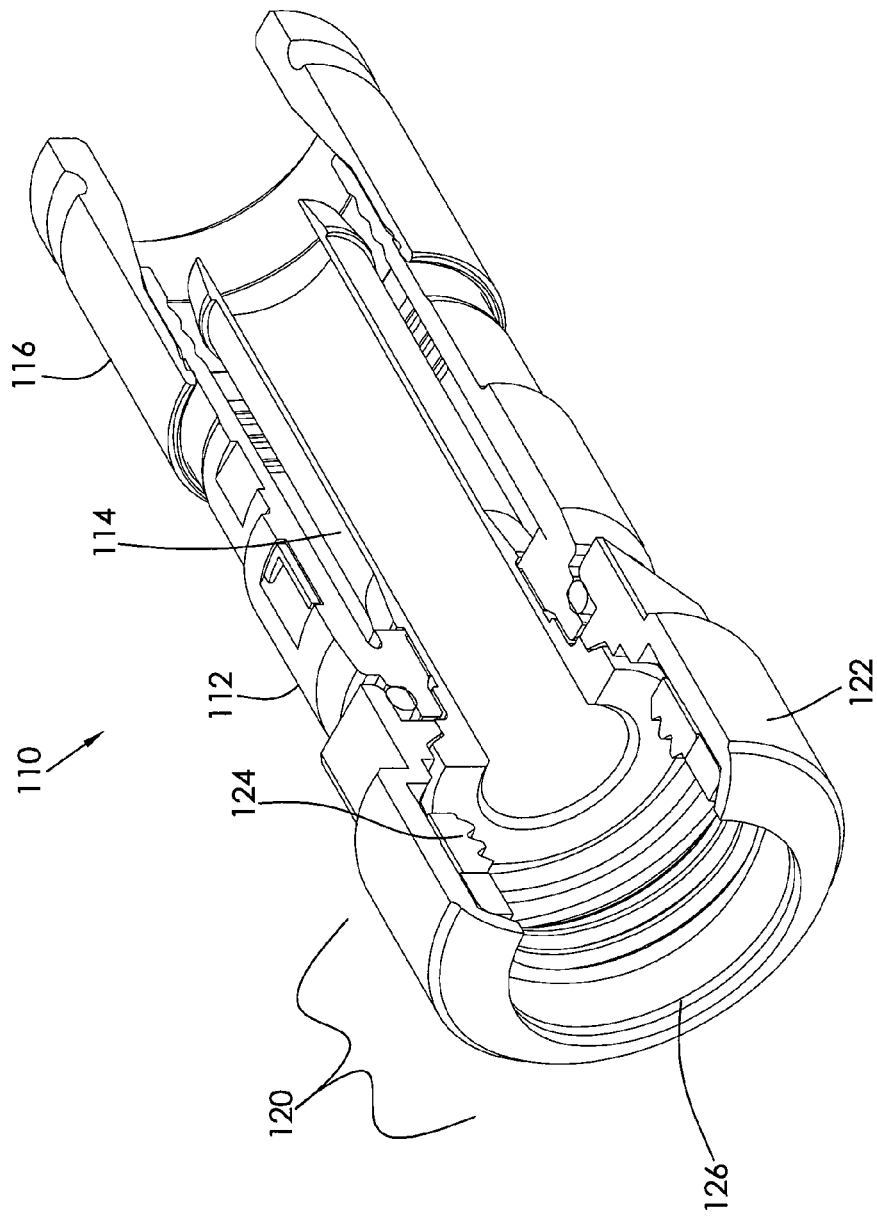
FIG. 2 depicts a partial cutaway view of a preferred closed position embodiment of the invention.

FIG. 2 is similar to FIG. 1 in that a connection assembly 110 comprises a connector body 112 housing a post 114, and is partially covered by a compression sleeve 116, that also partially encompasses the post 114 and includes a closed embodiment of the inventive post sealing assembly 120. The nut component 122 thereof is noticeably closed at its top end, although it still includes a threaded actuator component 124 with a deformable sealing component 126 placed atop the actuator 124. In this manner, when attached and conjoined with a threaded port (528 in FIG. 6), the sealing component 126 will contact with the port threads only at its inner annular surface.

Figure 3:
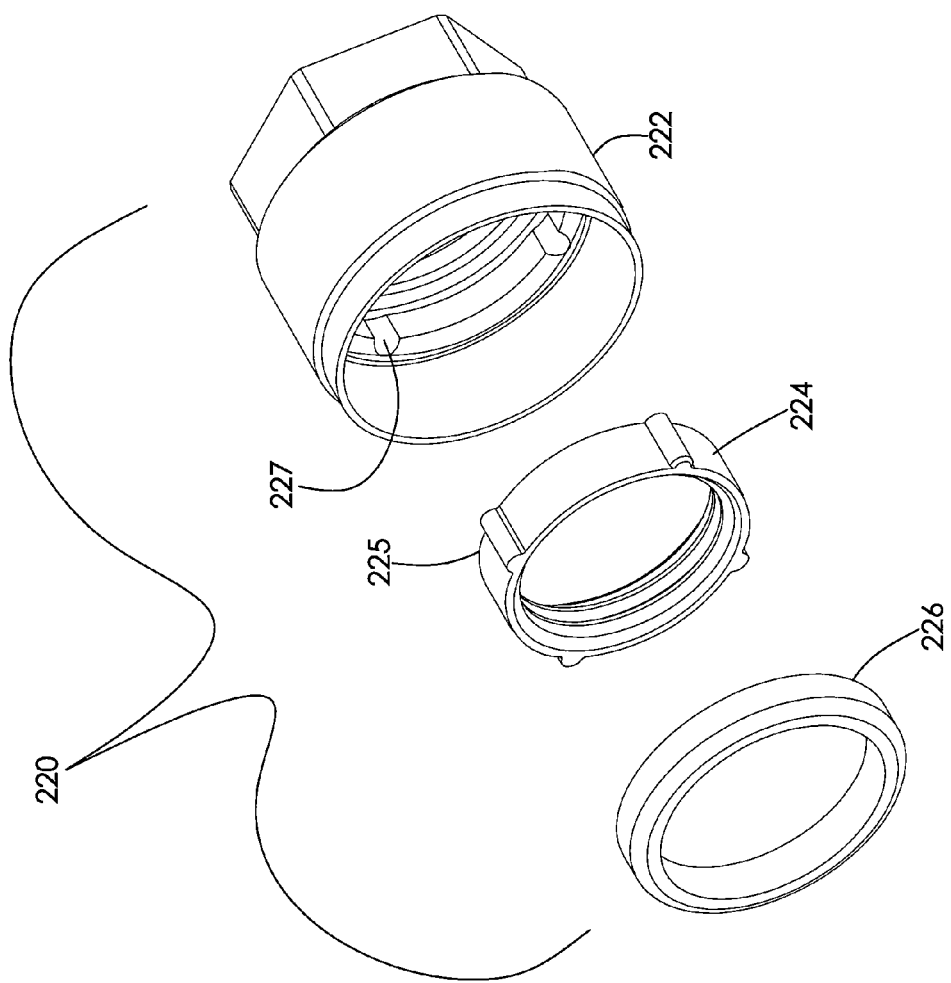
FIG. 3 depicts an exploded view of one potentially preferred inventive port sealing assembly with an internal threaded nut having four uniform arced distensions for complementary placement within an actuator.
Figure 4:
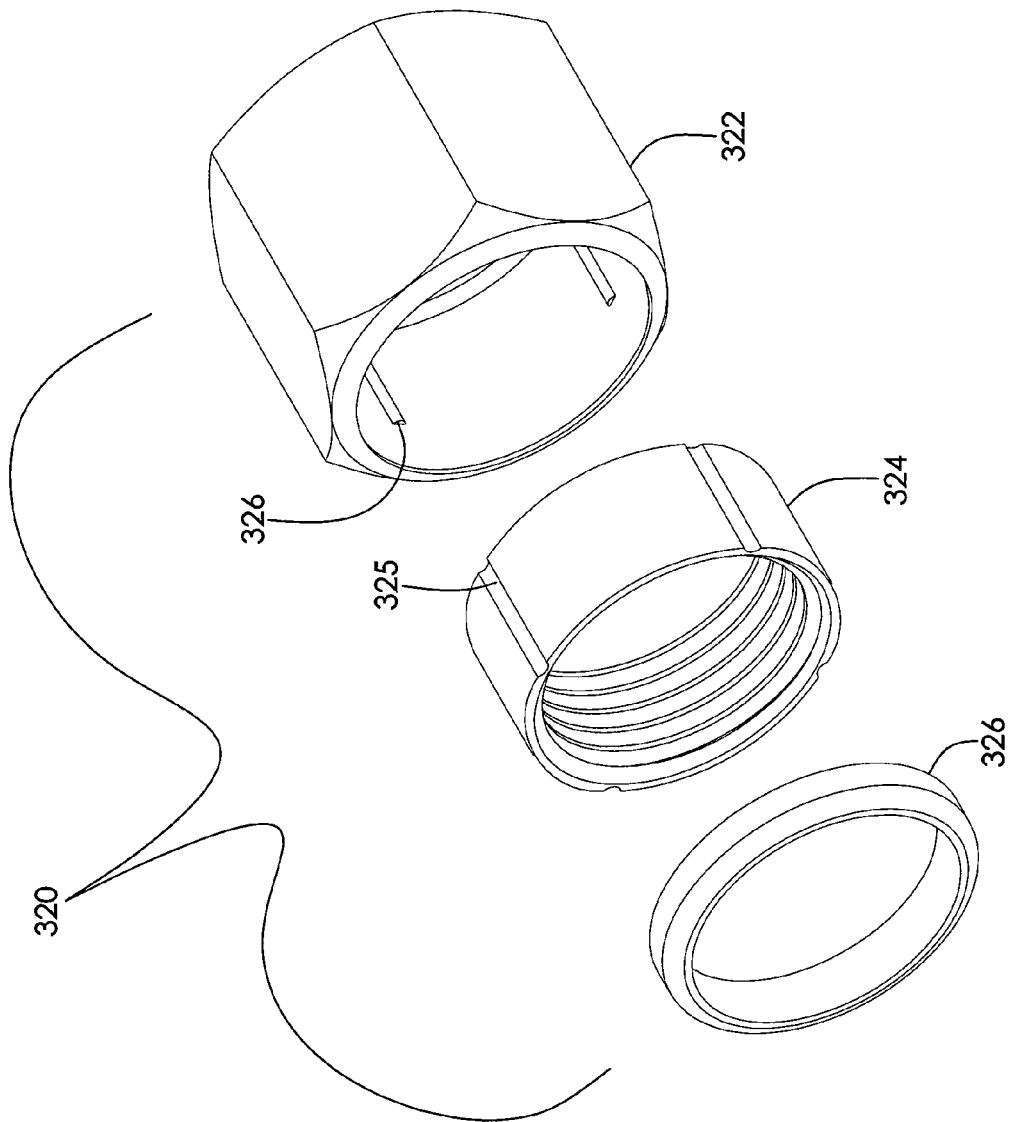
FIG. 4 depicts an exploded view of one potentially preferred inventive port sealing assembly with an internal threaded nut having four uniform arced indentations for complementary placement within an actuator.
Figure 5:
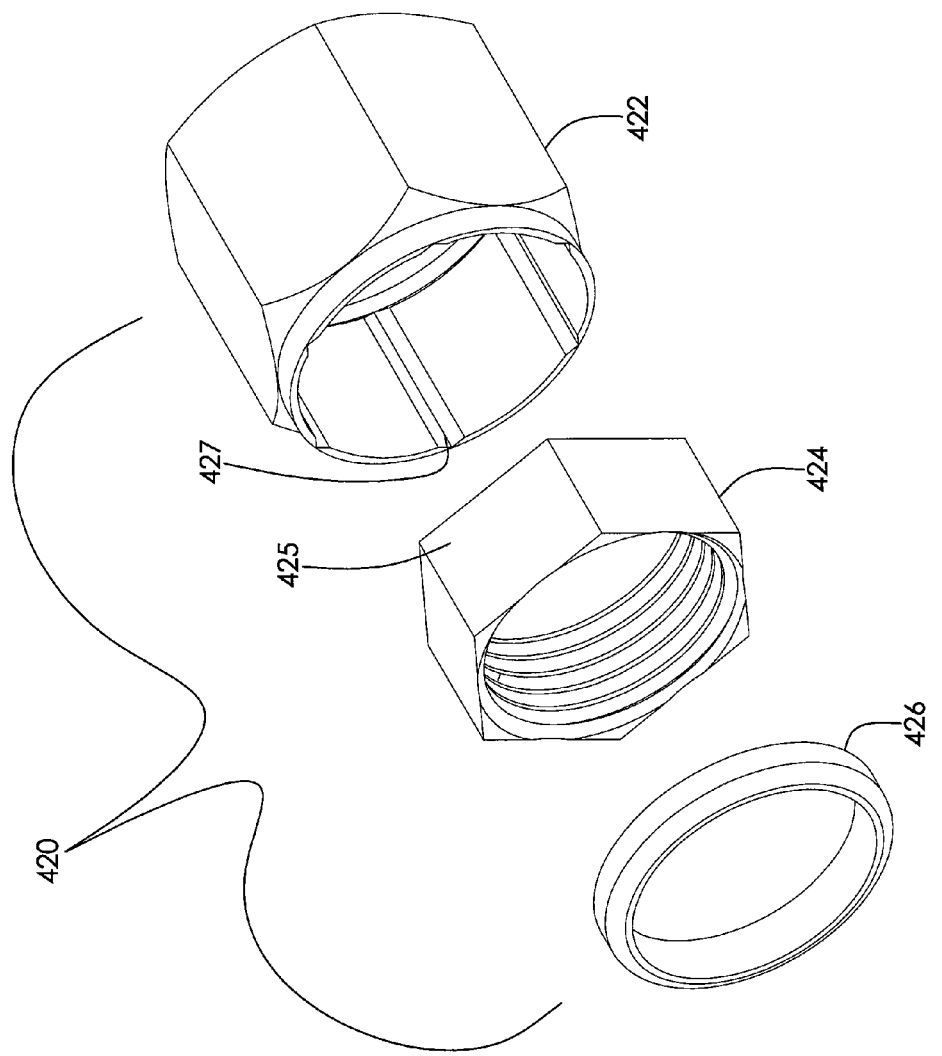
FIG. 5 depicts an exploded view of one potentially preferred inventive port sealing assembly with an internal threaded nut having six uniform flat sides for complementary placement within an actuator.

FIGS. 3-5 thus separate out the three components of three non-limiting, potentially preferred embodiments of port sealing assemblies. In FIG. 3, the assembly 220 comprises the ring-shaped deformable sealing component 226 as well as the threaded actuator 224 and nut component 222. Noticeably, the threaded actuator 224 includes, in this embodiment, arced distensions 225 on its outer surface. Such distensions 225 are complementary in shape to arced indentations 227 within the inner surface of the nut component 222. Coupled with the general ring-shaped configurations of both the threaded actuator 224 and the nut 222, upon proper alignment the threaded actuator 224 will nest within the nut 222; thus, the diameter of the threaded actuator 224 is sufficiently sized to properly nest in such a fashion that the distensions 225 are also properly aligned with the indentations 227 of the nut 222 to permit rotation of the threaded actuator 224 upon rotation of the nut 222 when in nested relation thereto and at suitable force to translate into proper tightening of the threads of the actuator 224 to a threaded port (528 of FIG. 6). FIG. 4 provides one alternative arrangement of the threaded actuator 324 and nut 322 wherein the opposite configuration on the outer and inner surfaces of those components 324, 322, respectively, are provided for similar rotational purposes (i.e., arced indentations 325 are present on the outer surface of the threaded actuator 324 and arced distensions 327 are present on the inner surface of the nut 322). Utilized with the deformable sealing component 326, the port sealing assembly 320 provides the same function as in FIG. 3. FIG. 5 then depicts a totally different potentially preferred embodiment for the port sealing assembly 420, but utilizing the same type of ring-shaped deformable sealing component 426. The threaded actuator 424 in this embodiment has an hexagonal outer surface 425 with six equivalent edges, complementary in configuration with the inner surface indentations 427 of the nut component 422. In essence, in order to apply proper rotational force for proper tightening of the threaded actuator 424 over the threads of a port (528 in FIG. 6), any configuration may be utilized wherein the actuator component 424 properly nests within the nut component 422 and can be rotated upon application of torque to the nut 422. Thus, as noted above, any geometrical configuration may be utilized for such a purpose with those two components.

Figure 6:
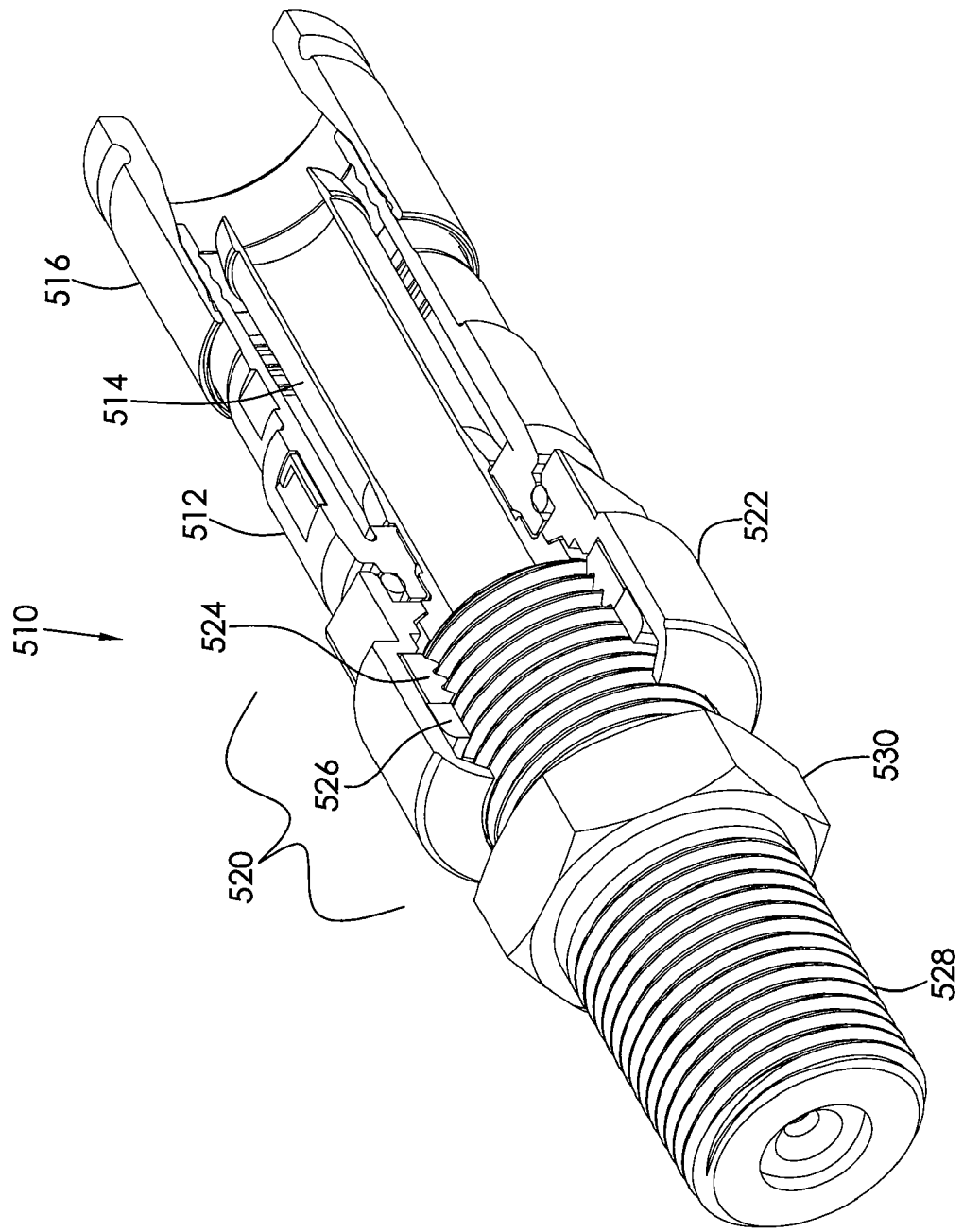
FIG. 6 depicts a partial cutaway view of an attachment between the connector of FIG. 2 with a non-standard F interface port.

FIG. 6 thus shows the connection between a threaded cable port 528 to a connection assembly 510 via the utilization of a port sealing assembly 520. The threaded port 528 is of a non-standard lengthy F type with D flats 530 to limit entry of the port 528 into a connection assembly 510. The threaded port 528 in this depiction covers the post 514 upon attachment and conjoining therewith the connector body 512. A compression sleeve 516 is present to protect the post 514 as well. Upon introduction of the threaded port 528, the port sealing assembly 520 is actuated; in this respect, the figure shows the threaded actuator 524 has already been moved along the threads of the port 528 upon rotation of the nut 522. As such, the deformable sealing component 526 has been compressed to a certain degree into the interstitial space between the threads of the port 528 that are external from the actual point of connection between the connector body 512 and the threaded port 528. Thus, moisture cannot migrate past the sealing point.

Figure 7:
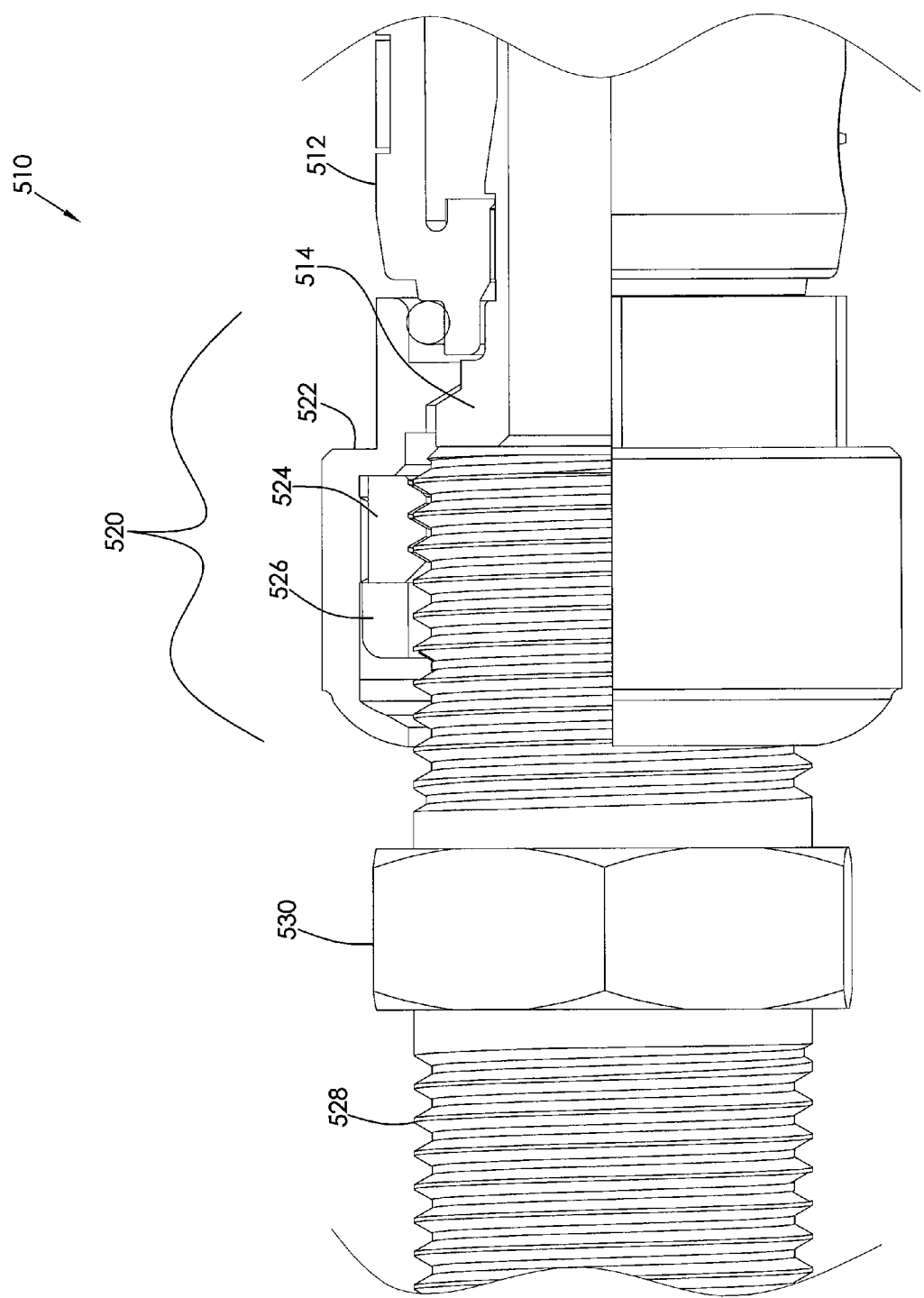
FIG. 7 depicts a partial cutaway side view of the attachment of FIG. 6 in non-engaged position relative to the port sealing assembly.
Figure 8:
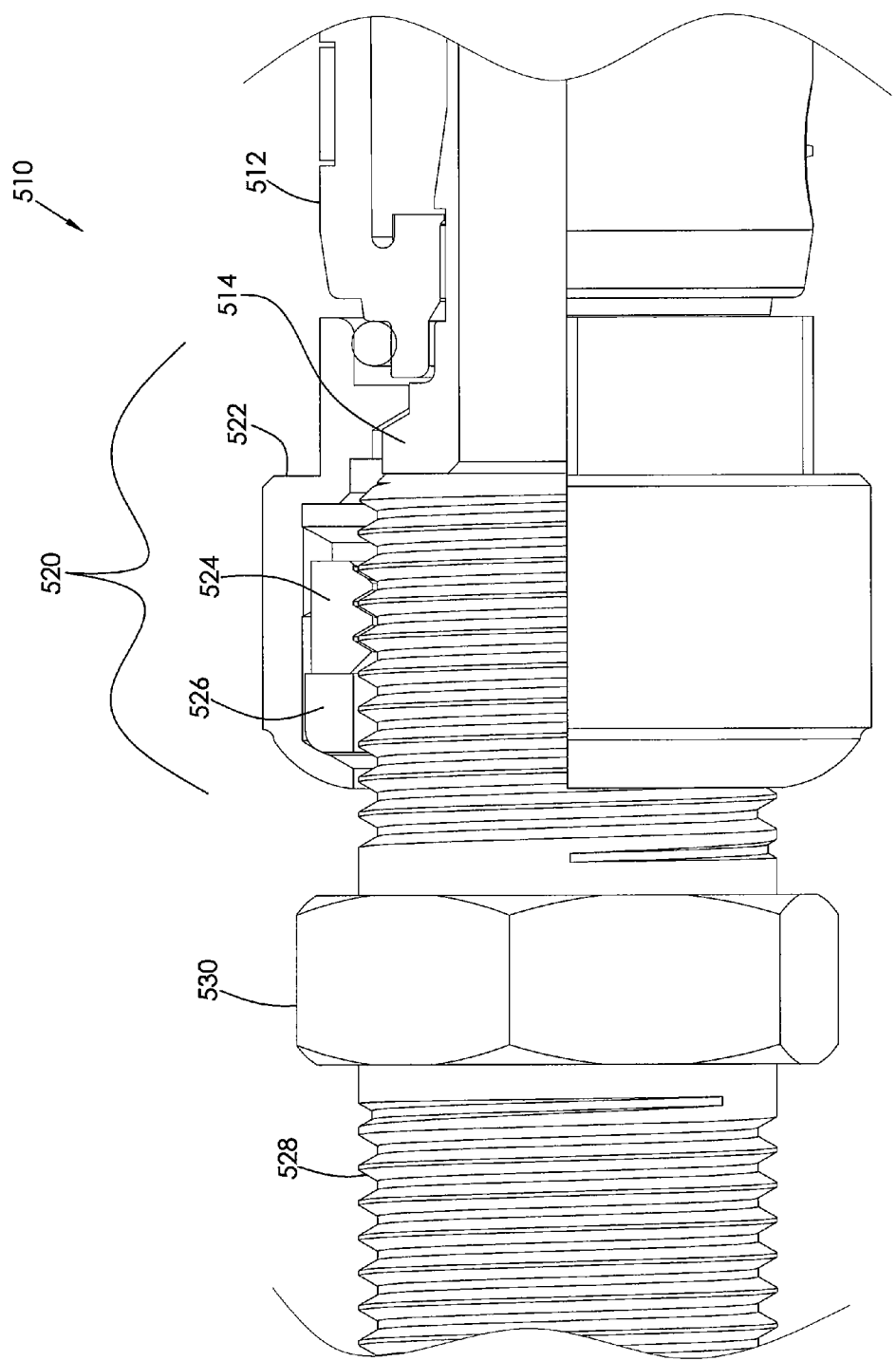
FIG. 8 depicts a partial cutaway side view of the attachment of FIG. 6 in partially engaged position relative to the port sealing assembly.
Figure 9:
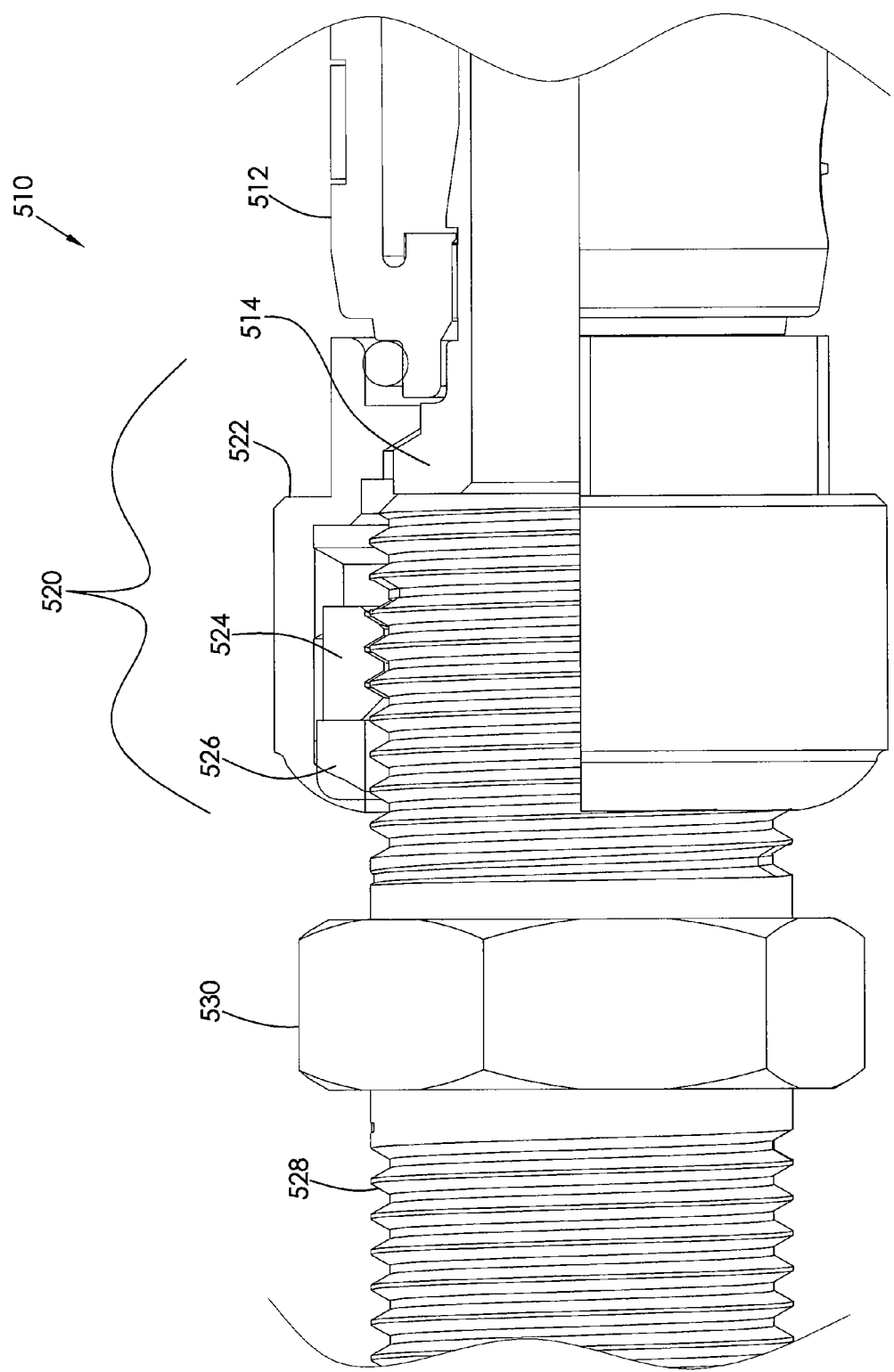
FIG. 9 depicts a partial cutaway side view of the attachment of FIG. 6 in fully engaged, sealed, position relative to the port sealing assembly.

FIGS. 7-9 show varying degrees of tightening of the nut component 522 and the differing degrees of compression of the deformable sealing component 526 as a result. In FIG. 7, the port sealing assembly 520 is not engaged with the threaded port 528 that is limited by D flats 530 as to introduction within the connection assembly 510. The connector body 512, housing the post 514 has been preliminary introduced to the edges of the port threads prior to such port sealing assembly 520 engagement. Thus, the nut component 522 has not been rotated, the threaded actuator 524 has not moved upward onto the port threads 528 and the deformable sealing component 526 is still in full non-compressed state. FIG. 8 shows seal advancement upon initial actuation of the nut 522 through two revolutions around the threads of the port 528 by the threaded actuator 524. The deformable sealing component 526 is exhibiting initial compression into the thread spaces of the port 528 due to such initial tightening of the nut 522. FIG. 9 thus shows the complete advancement of the threaded actuator 524 along the threads of the port 528 through the maximum number of revolutions (rotations) of the nut 522. The deformable sealing component 526 is thus compressed as much as possible within the interstitial spaces of the port threads 528 providing a reliable, effective, moisture barrier seal at a location external to the actual point of connection between the threaded port 528 and the connector body 512 and the post 514 therein. Such a configuration thus exhibits a reliable, easy-to-install, cost-effective, and moisture-proof cable/port connection without possibility of appreciable moisture entering into the threads of the subject port present within the body of the subject connection assembly itself.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A cable connection assembly exhibiting a moisture migration prevention component and a threaded actuator integrated entirely within a nut component of said assembly, wherein upon attachment to a threaded port, said connection assembly exhibits moisture migration prevention at a location external to a plurality of threads of the threaded port engaged within said connection assembly.

2. A port sealing assembly comprising:
   a nut component, a threaded actuator component, and a deformable sealing component;
   wherein said threaded actuator component nests entirely within said nut component;
   wherein said threaded actuator component is ring-shaped with an inner threaded surface and an outer surface;
   wherein said nut component is ring-shaped with an inner surface and an outer surface;
   wherein said outer surface of said threaded actuator component exhibits a configuration complementary in shape to said inner surface of said nut component such that when nesting entirely within said actuator component, the rotation of said nut component causes the rotation of said threaded actuator component; and
   wherein said deformable sealing component is ring-shaped and nests within said nut component atop said threaded actuator component.

3. The port sealing assembly of claim 2 wherein said deformable sealing component is an elastomer.

4. The port sealing assembly of claim 3 wherein said elastomer is selected from the group consisting of thermoplastic rubber and thermoset rubber.

5. The port sealing assembly of claim 4 wherein said elastomer is a thermoplastic rubber.

6. The port sealing assembly of claim 4 wherein said elastomer is a thermoset rubber selected from the group consisting of natural rubber, styrene butadiene rubber, nitrile butadiene rubber, ethylene-propylene diene monomer rubber, urethane rubber, and silicone rubber.

7. A cable connection assembly including the port sealing assembly of claim 2 and a threaded port.

8. A cable connection assembly including the port sealing assembly of claim 3 and a threaded port.

9. A cable connection assembly including the port sealing assembly of claim 4 and a threaded port.

10. A cable connection assembly including the port sealing assembly of claim 5 and a threaded port.

11. A cable connection assembly including the port sealing assembly of claim 6 and a threaded port.

12. A method of applying a moisture migration preventive seal to a full cable connection between said cable connection assembly of claim 7 and a coaxial cable threaded port through initial attachment of said cable connection assembly to said port followed by actuation of said nut, thereby moving said threaded actuator in the direction of said port, thereby deforming said deformable sealing component into the interstitial spaces of a plurality of threads of the port.

13. A method of applying a moisture migration preventive seal to a full cable connection between said cable connection assembly of claim 8 and a coaxial cable threaded port through initial attachment of said cable connection assembly to said port followed by actuation of said nut, thereby moving said threaded actuator in the direction of said port, thereby deforming said deformable sealing component into the interstitial spaces of a plurality of threads of the port.

14. A method of applying a moisture migration preventive seal to a full cable connection between said cable connection assembly of claim 9 and a coaxial cable threaded port through initial attachment of said cable connection assembly to said port followed by actuation of said nut, thereby moving said threaded actuator in the direction of said port, thereby deforming said deformable sealing component into the interstitial spaces of a plurality of threads of the port.

15. A method of applying a moisture migration preventive seal to a full cable connection between said cable connection assembly of claim 10 and a coaxial cable threaded port through initial attachment of said cable connection assembly to said port followed by actuation of said nut, thereby moving said threaded actuator in the direction of said port, thereby deforming said deformable sealing component into the interstitial spaces of a plurality of threads of the port.

16. A method of applying a moisture migration preventive seal to a full cable connection between said cable connection assembly of claim 11 and a coaxial cable threaded port through initial attachment of said cable connection assembly to said port followed by actuation of said nut, thereby moving said threaded actuator in the direction of said port, thereby deforming said deformable sealing component into the interstitial spaces of a plurality of threads of the port.

* * * * *